United States Patent
Vail et al.

(10) Patent No.: US 8,361,429 B2
(45) Date of Patent: Jan. 29, 2013

(54) POLYCRYSTALLINE DIAMOND MATERIALS AND RELATED PRODUCTS

(75) Inventors: Michael A. Vail, Genola, UT (US); Kenneth E. Bertagnolli, Riverton, UT (US); Jason Wiggins, Draper, UT (US); Jiang Qian, Cedar Hills, UT (US); David P. Miess, Highland, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/245,249

(22) Filed: Sep. 26, 2011

(65) Prior Publication Data
US 2012/0011779 A1    Jan. 19, 2012

Related U.S. Application Data

(62) Division of application No. 12/148,927, filed on Apr. 22, 2008, now Pat. No. 8,057,775.

(51) Int. Cl.
| | |
|---|---|
| *B01J 3/06* | (2006.01) |
| *E21B 10/36* | (2006.01) |
| *B24D 3/02* | (2006.01) |
| *C09C 1/68* | (2006.01) |
| *B29C 67/00* | (2006.01) |

(52) U.S. Cl. ............ 423/446; 175/434; 51/307; 51/309; 264/125

(58) Field of Classification Search ................... None
See application file for complete search history.

(56) References Cited

U.S. PATENT DOCUMENTS

| | | | |
|---|---|---|---|
| 4,380,471 A * | 4/1983 | Lee et al. | ............ 419/11 |
| 4,380,474 A | 4/1983 | Cioca et al. | |
| 4,636,253 A | 1/1987 | Nakai et al. | |
| 5,468,268 A | 11/1995 | Tank et al. | |
| 5,505,748 A * | 4/1996 | Tank et al. | ............ 51/293 |
| 5,855,996 A | 1/1999 | Corrigan et al. | |
| 6,447,852 B1 | 9/2002 | Gordeev et al. | |
| 7,377,341 B2 | 5/2008 | Middlemiss et al. | |

(Continued)

FOREIGN PATENT DOCUMENTS

| | | |
|---|---|---|
| EP | 0019824 | 12/1980 |
| WO | WO 2007/035394 | 3/2007 |

(Continued)

OTHER PUBLICATIONS

James E. Funk & Dennis R. Dinger, "Predictive Process Control of Crowded Particulate Suspensions: Applied to Ceramic Manufacturing." (1st ed., Kluwer Academic Publishers 1994, pp. 85-146.

(Continued)

*Primary Examiner* — Melvin C Mayes
*Assistant Examiner* — Guinever Gregorio
(74) *Attorney, Agent, or Firm* — Workman Nydegger

(57) ABSTRACT

Embodiments relate to methods of fabricating PCD materials by subjecting a mixture that exhibits a broad diamond particle size distribution to an HPHT process, PCD materials so-formed, and PDCs including a polycrystalline diamond table comprising such PCD materials. In an embodiment, a PCD material includes a plurality of bonded diamond grains that exhibit a substantially unimodal diamond grain size distribution characterized, at least in part, by a parameter θ that is less than about 1.0.

$$\theta = \frac{x}{6 \cdot \sigma},$$

where x is the average grain size of the substantially unimodal diamond grain size distribution, and σ is the standard deviation of the substantially unimodal diamond grain size distribution.

19 Claims, 13 Drawing Sheets

U.S. PATENT DOCUMENTS

| | | | |
|---|---|---|---|
| 2004/0037948 A1 | 2/2004 | Tank et al. | |
| 2004/0194689 A1 | 10/2004 | Sung | |
| 2004/0199260 A1 | 10/2004 | Pope et al. | |
| 2006/0236616 A1 | 10/2006 | Wan | |
| 2007/0056778 A1* | 3/2007 | Webb et al. | 175/434 |
| 2008/0023231 A1 | 1/2008 | Vail | |
| 2009/0260895 A1 | 10/2009 | Vail | |
| 2012/0167480 A1* | 7/2012 | Benea et al. | 51/307 |

FOREIGN PATENT DOCUMENTS

| | | |
|---|---|---|
| WO | WO 2008/094190 | 8/2008 |
| WO | WO 2009/131562 | 10/2009 |

OTHER PUBLICATIONS

Dinger, Dennis R. "Particle Calculations for Ceramists,"(Dinger Ceramic Consulting Services 2001, pp. 56-62.

Dinger, Dennis R. et al, "Particle-Packing Phenomena and their Application in Materials Processing" MRS Bulletin, vol. 22, No. 12, Dec. 1997, pp. 12-23.

Dinger, Dennis R. Ceramic Processing E-zine (vol. 1, No. 9, Particle Packing and Pore Size Distributions, Dennis R. Dinger, Jul. 1, 2003—9 pages) www.dingerceramics.com/CeramicProcessingE-zine/CPEBackIssues/Vol1Num9.htm.

International Search Report and Written Opinion dated Oct. 6, 2009 as issued in International Application No. PCT/US2008/008237 filed Jul. 3, 2008.

U.S. Appl. No. 12/148,927, Sep. 15, 2010, Office Action.
U.S. Appl. No. 12/148,927, Oct. 27, 2010, Office Action.
U.S. Appl. No. 12/148,927, Mar. 31, 2011, Office Action.
U.S. Appl. No. 12/148,927, Jul. 8, 2011, Notice of Allowance.
U.S. Appl. No. 12/148,927, Oct. 26, 2011, Issue Notification.

* cited by examiner

POLYCRYSTALLINE DIAMOND MATERIALS AND RELATED PRODUCTS

CROSS-REFERENCE TO RELATED APPLICATIONS

This application is a divisional of U.S. application Ser. No. 12/148,927 filed on 22 Apr. 2008, now U.S. Pat. No. 8,057,775, the disclosure of which is incorporated herein, in its entirety, by reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The substrate is often brazed or otherwise joined to an attachment member, such as a stud or a cylindrical backing. A stud carrying the PDC may be used as a PDC cutting element when mounted to a bit body of a rotary drill bit by press-fitting, brazing, or otherwise securing the stud into a receptacle formed in the bit body. The PDC cutting element may also be brazed directly into a preformed pocket, socket, or other receptacle formed in the bit body. A rotary drill bit typically includes a number of PDC cutting elements affixed to the bit body.

Conventional PDCs are normally fabricated by placing a cemented-carbide substrate into a container or cartridge with a volume of diamond particles positioned on a surface of the cemented-carbide substrate. A number of such cartridges may be loaded into an HPHT press. The substrates and volume of diamond particles are then processed under HPHT conditions in the presence of a catalyst material that causes the diamond particles to bond to one another to form a matrix of bonded diamond grains defining a diamond table. The catalyst material is often a metal-solvent catalyst, such as cobalt, nickel, iron, or alloys thereof that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains. Often, a solvent catalyst may be mixed with the diamond particles prior to subjecting the diamond particles and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. The undersaturated graphite tends to dissolve into solvent catalyst and the supersaturated diamond tends to deposit onto existing diamond particles or nucleate new diamond crystals to form diamond-to-diamond bonds. Accordingly, diamond grains become mutually bonded to form a matrix of polycrystalline diamond ("PCD") with interstitial regions between the bonded diamond grains being occupied by the solvent catalyst.

Despite the availability of a number of different PCD materials, manufacturers and users of PCD materials continue to seek PCD materials that exhibit improved toughness, wear resistance, and/or thermal stability.

SUMMARY

Embodiments of the invention relate to methods of fabricating PCD materials by subjecting a mixture that exhibits a broad diamond particle size distribution to an HPHT process, PCD materials so-formed, and PDCs including a polycrystalline diamond table comprising such PCD materials. In an embodiment, a method includes subjecting a mixture to heat and pressure sufficient to form a PCD material. The mixture comprises a plurality of diamond particles exhibiting a diamond particle size distribution characterized, at least in part, by a parameter $\theta$ that is less than about 1.0. The parameter $\theta$ may be represented by the following equation:

$$\theta = \frac{x}{6 \cdot \sigma}$$

where x is the average particle size of the diamond particle size distribution and $\sigma$ is the standard deviation of the diamond particle size distribution.

In an embodiment, a PCD material comprises a plurality of bonded diamond grains. The plurality of bonded diamond grains exhibit a diamond grain size distribution characterized, at least in part, by a parameter $\theta$ that is less than about 1.0 and represented by the following equation:

$$\theta = \frac{x}{6 \cdot \sigma}$$

where x is the average grain size of the diamond grain size distribution and $\sigma$ is the standard deviation of the diamond grain size distribution.

In an embodiment, a method includes subjecting a mixture to heat and pressure sufficient to form a PCD material. The mixture includes a plurality of diamond particles exhibiting a diamond particle size distribution that can be generally modeled by the following equation:

$$\frac{CPFT}{100} = \frac{D^n - D_S^n}{D_L^n - D_S^n}$$

where CPFT is the cumulative percent finer than, D is particle size, $D_L$ is the largest-sized diamond particle, $D_S$ is the smallest-sized diamond particle, and n is the distribution modulus.

In an embodiment, a PCD material includes a plurality of bonded diamond grains. The plurality of bonded diamond grains exhibit a diamond grain size distribution that can be generally modeled by the following equation:

$$\frac{CPFT}{100} = \frac{D^n - D_S^n}{D_L^n - D_S^n}$$

where CPFT is the cumulative percent finer than, D is grain size, $D_L$ is the largest-sized diamond grain, $D_S$ is the smallest-sized diamond grain, and n is the distribution modulus.

In an embodiment, the disclosed PCD materials may be employed in a PDC. The PDC comprises a substrate including a PCD table bonded thereto that comprises any of the disclosed embodiments of PCD materials.

Other embodiments relate to applications utilizing the disclosed PCD materials in various articles and apparatuses, such as rotary drill bits, bearing apparatuses, wire-drawing dies, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to methods of fabricating PCD materials by subjecting a mixture having a broad diamond particle size distribution to an HPHT process, PCD materials so-formed, and PDCs including a PCD table comprising such PCD materials. The embodiments of PCD materials disclosed herein may be used in a variety of applications, such as drilling tools (e.g., compacts, cutting elements, gage trimmers, etc.), machining equipment, bearing apparatuses, wire-drawing dies, and other apparatuses.

A method of fabricating a PCD material according to an embodiment includes subjecting a mixture to heat and pressure sufficient to form the PCD material. The mixture includes a plurality of diamond particles that exhibit a broad diamond particle size distribution. Typically, diamond particles are non-spherical and exhibit a polygonal geometry with generally planar, cleaved or faceted faces. Non-spherical particles, such as diamond particles, may exhibit higher packing densities (e.g., a packing density of about 0.80 to about 0.99) when a broad diamond particle size distribution is employed and, consequently, a PCD material formed from the mixture may exhibit enhanced diamond-to-diamond bonding and improved wear resistance, thermal stability, and/or other performance characteristics.

Figure 1:
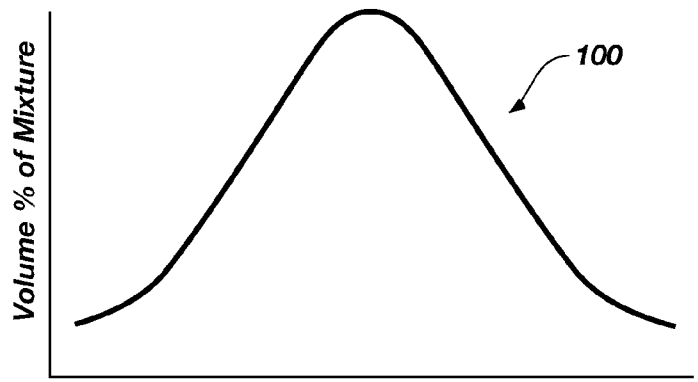
FIG. 1 is a graph a diamond particle size distribution of a mixture of diamond particles according to an embodiment.

FIG. 1 is a graph of the diamond particle size distribution 100 of a mixture according to an embodiment, which may be characterized, at least in part, by a parameter θ that is less than about 1.0, in another example about 0.25 to about 1.0, and in another example about 0.3 to about 0.9. In some embodiments, θ may be about 0.3 to about 0.7, in another example about 0.3 to about 0.6, and in another example about 0.3 to about 0.4. The parameter θ may be represented by equation (1) as follows:

$$\theta = \frac{x}{6 \cdot \sigma} \quad (1)$$

where x is the average particle size and σ is the standard deviation of the diamond particle size distribution 100.

In some embodiments, the diamond particle size distribution 100 of the mixture may further exhibit an average particle size (e.g., average particle diameter) of about 5 μm to about 30 μm, a standard deviation of about 2 μm to about 15 μm, a skewness (i.e., degree of symmetry) of about −2 to about +2, and a kurtosis that may be mesokurtic, leptokurtic, or platykurtic. In another embodiment, the diamond particle size distribution 100 of the mixture may be exhibit an average particle size (e.g., average particle diameter) of about 10 μm to about 20 μm and a standard deviation of about 4 μm to about 10 μm. In another embodiment, the diamond particle size distribution 100 of the mixture may exhibit an average particle size (e.g., average particle diameter) of about 12 μm to about 15 μm and a standard deviation of about 6 μm to about 8.5 μm.

In addition to the parameter θ being less than about 1.0, the statistical parameters that characterize more specific embodiments of broad diamond particle size distributions are described below in Table I.

| Diamond Mixture | Average Particle Size (μm) | Standard Deviation | Skewness | Kurtosis |
| --- | --- | --- | --- | --- |
| 1 | 11.0-12.0 | 5.0-6.0 | 1.0-1.5 Right | 1.0-2.0 Leptokurtic |
| 2 | 15.0-16.0 | 6.0-9.0 | 1.0-1.6 Right | 2.0-3.5 Leptokurtic |
| 3 | 19.0-20.0 | 8.0-9.0 | 0-0.20 Right | −0.5-−0.8 Platykurtic |
| 4 | 25.0-26.0 | 10.0-11.0 | 0-0.10 Right | −0.5-−0.8 Platykurtic |

In certain embodiments, the diamond particle size distribution 100 of the mixture may exhibit and/or may be generally modeled (i.e., approximated) as being a Gaussian distribution (e.g., a standard normal distribution) and, thus, substantially unimodal. In an embodiment, the diamond particle size distribution 100 of the mixture may exhibit and/or may be generally modeled as a Gaussian, non-normal distribution in which the skewness of the diamond particle size distribution 100 may be non-zero. It is noted that the diamond particle size distribution 100 shown in FIG. 1 represents merely one embodiment and the mixture may have other selected diamond particle size distributions.

The mixture of diamond particles having the broad diamond particle distribution may be formed by various techniques, such as removing a selected portion of diamond particles allowed to settle in a fluid medium, comminuting, milling, screening, or other techniques. In an embodiment for forming a mixture of diamond particles having a broad diamond particle size distribution, a mixture of diamond particles may be formed by mixing discrete diamond particle mixes (e.g., discrete mixes with different diamond particles distributions) each having a different respect average particle size, followed, optionally, by comminuting the multi-modal mixture for a sufficient time to form a substantially continuous broad diamond particle size distribution similar to the diamond particle size distribution 100 shown in FIG. 1. The comminuting may be effected by mixing the multi-modal mixture in an attritor mill, a ball mill, or another suitable mill. The aggressive milling process that comminutes the multi-modal mixture crushes some of the diamond particles thereof so that the modal peaks of the multi-modal mixture are reduced, broadened, and/or eliminated when milled for a sufficient time.

Figure 2A:
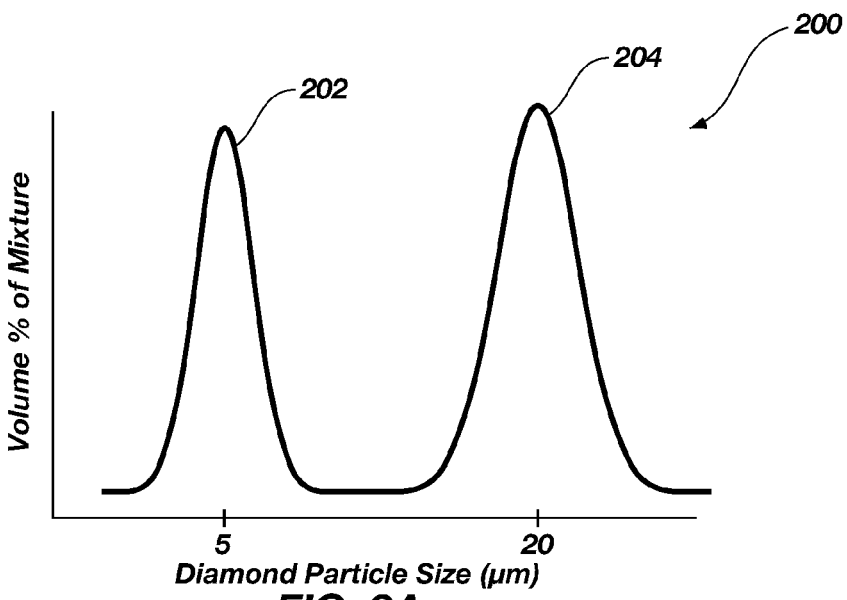
FIG. 2A is a graph of a bi-modal diamond particle size distribution of a mixture of diamond particles.
Figure 2B:
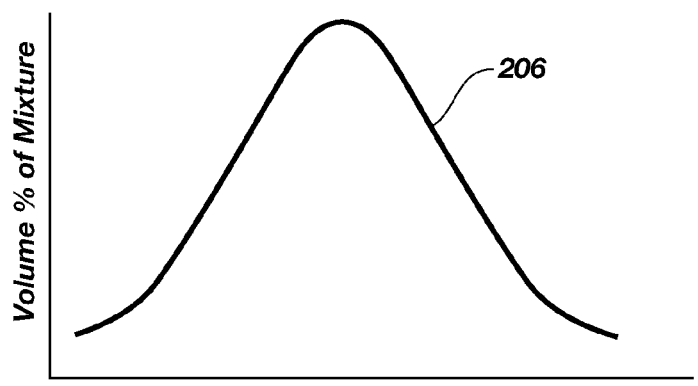
FIG. 2B is a graph of a broad diamond particle size distribution of milled diamond particles formed by milling the mixture having the bi-modal diamond particle size distribution shown in FIG. 2A.

Referring to FIG. 2A, according to an illustrative embodiment, a diamond particle mixture having a bi-modal diamond particle size distribution 200 with a first mode 202 of 5 μm and a second mode 204 of 20 μm may be formed by mixing diamond particles having a 5 μm average particle size and diamond particles having a 20 μm average particle size. Aggressively milling the mixture having the bi-modal diamond particle size distribution 200 crushes a portion of the diamond particles (e.g., the relatively larger 20 μm diamond particles and the relatively smaller 5 μm diamond particles) and, when performed for a sufficient time, the first and second modes 202 and 204 of the bi-modal diamond particle mixture 200 are modified. Referring to FIG. 2B, after aggressively milling, the milled mixture of diamond particles exhibits a diamond particle size distribution 206 that may be similar to the diamond particle size distribution 100 shown in FIG. 1. It is also noted that in such an embodiment, while the diamond particle size distribution 206 is relatively broad, it may be at least bi-modal depending upon the particular size of the precursor diamond particles and/or milling parameters (e.g., milling aggressiveness and milling time).

Figure 3A:
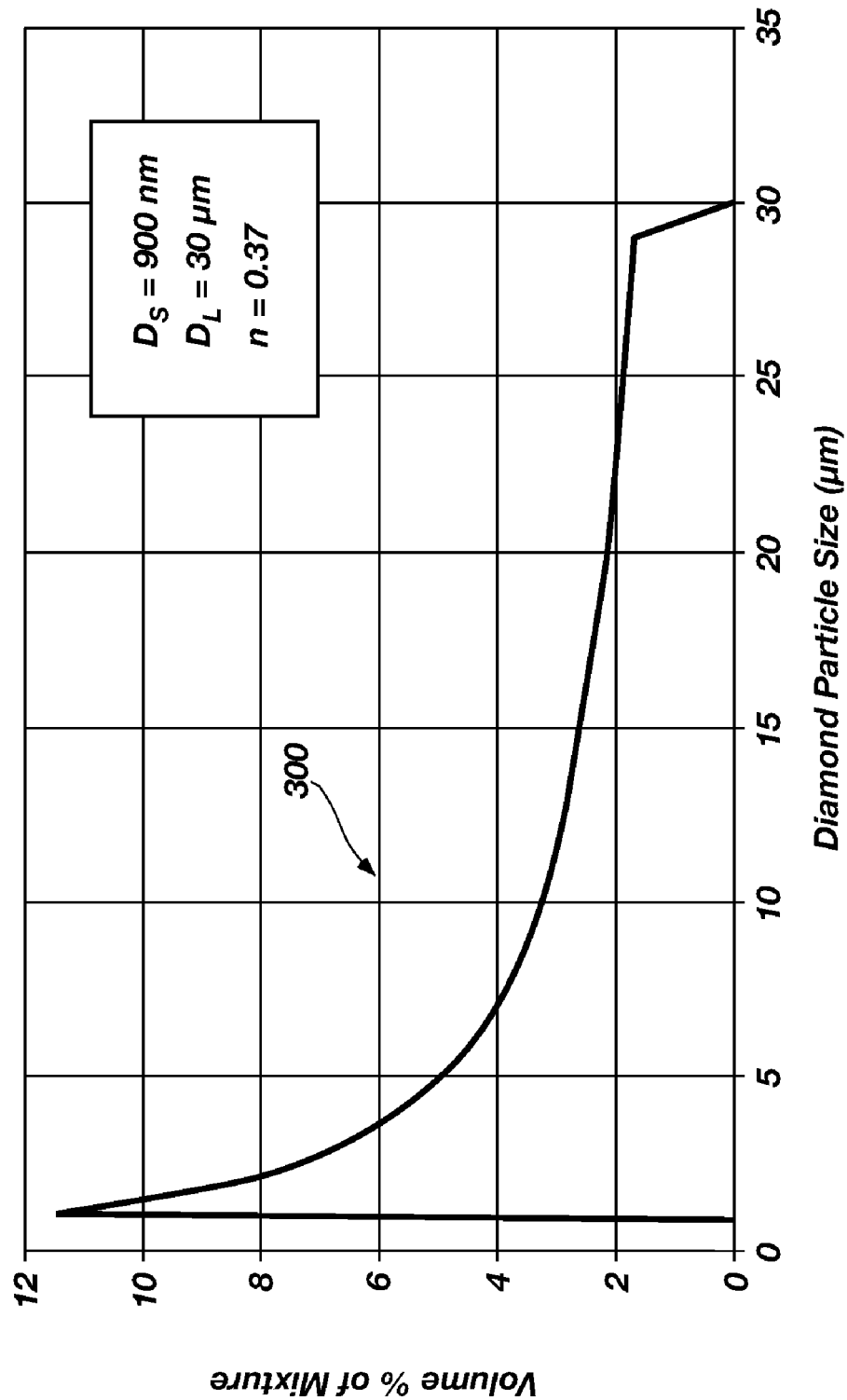
FIG. 3A is a graph of volume percent of diamond particles versus diamond particle size for a mixture of diamond particles having a broad diamond particle size distribution according to an embodiment.
Figure 3B:
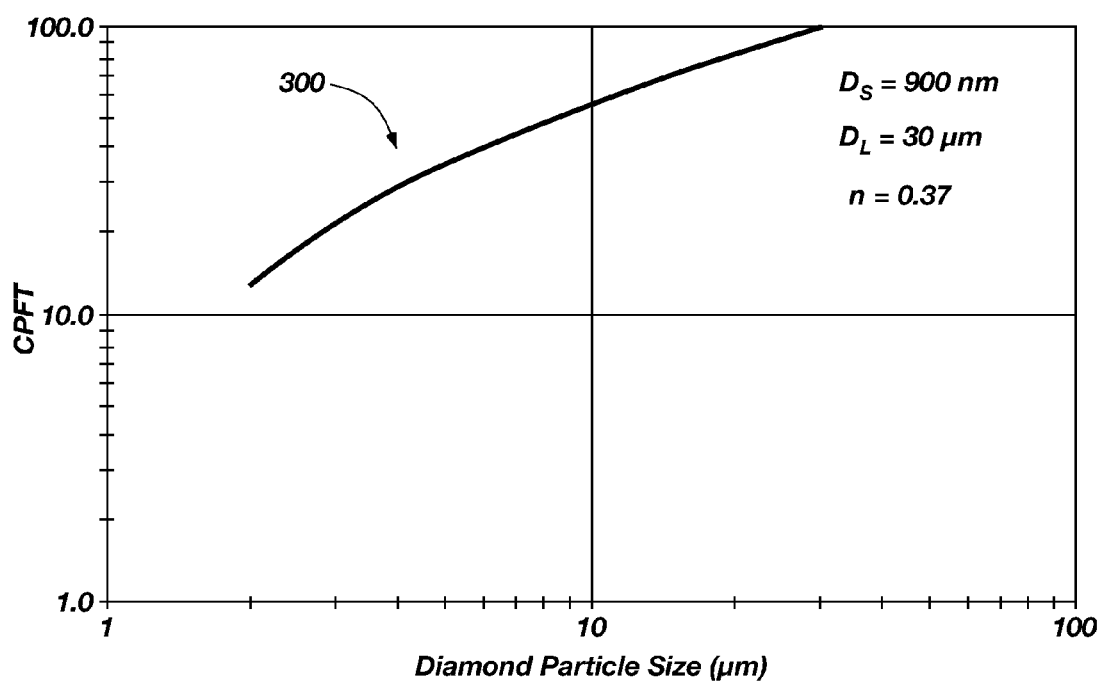
FIG. 3B is a graph of cumulative percent finer than versus diamond particle size for the mixture shown in FIG. 3A.

As discussed above, the diamond particle size distribution 100 shown in FIG. 1 merely represents one embodiment of a broad diamond particle size distribution. Referring to FIGS. 3A and 3B, in an illustrative embodiment, the mixture of diamond particles to be HPHT processed exhibits a diamond particle size distribution that may be characterized by and/or may be generally modeled (i.e., approximated) as a broad diamond particle size distribution 300. FIG. 3A is a graph of volume percent of diamond particles versus diamond particle size for a mixture of diamond particles having a diamond particle size distribution that can be characterized and/or generally modeled by a broad diamond particle size distribution 300 and FIG. 3B is a graph of cumulative percent finer than ("CPFT") of the diamond particles versus diamond particle size for the broad diamond particle size distribution 300 shown in FIG. 3A. The broad diamond particle size distribution 300 may be represented by equation (2) below:

$$\frac{CPFT}{100} = \frac{D^n - D_S^n}{D_L^n - D_S^n} \qquad (2)$$

CPFT is the cumulative percent finer than, D is particle size, $D_L$ is the largest-sized diamond particle, $D_S$ is the smallest-sized diamond particle, and n is the distribution modulus. For example, CPFT for a given diamond particle size indicates the percent of the mixture that has diamond particles smaller than that of the given diamond particle size. The broad diamond particle size distribution 300 may or may not exhibit the same possible range of values for the parameter θ as previously discussed with respect to the diamond particle size distribution 100 shown in FIG. 1. As can be appreciated from analyzing the broad diamond particle size distribution 300, a large volume percentage of the mixture is relatively smaller sized diamond particles.

In some embodiments, the largest-sized particle $D_L$ may be about 10 μm to about 50 μm and the smallest-sized particle $D_S$ may be about 100 nm to about 5 μm. In a more specific embodiment, the largest-sized particle $D_L$ may be about 20 μm to about 30 μm and the smallest-sized particle $D_S$ may be about 500 nm to about 1 μm. The distribution modulus n may be about 0.3 to about 0.5 and, in one example about 0.37. In the illustrated embodiment for the broad diamond particle size distribution 300 shown in FIGS. 3A and 3B, the largest-sized particle $D_L$ is about 30 μm, the smallest-sized particle $D_S$ is about 900 nm, and the distribution modulus n is about 0.37. It is noted that the specific values for $D_S$, $D_L$ and the distribution modulus n of the broad diamond particle size distribution 300 shown in FIGS. 3A and 3B are merely illustrative, and other values may utilized as described above.

The mixture of diamond particles may be formed to exhibit a diamond particle size distribution characterized by and/or generally modeled by equation (2) by appropriately mixing multiple mixes of diamond particles, in selected proportions, that each exhibits a Gaussian distribution and a different respective average particle size. The mixture of multiple cuts of diamond particles may be allowed to settle in a fluid medium or centrifuged, followed by removing a selected portion of the settled or centrifuged diamond particles that exhibits the desired diamond particle size distribution. Other techniques include sieving and/or comminuting (or other methods) respective Gaussian diamond particle mixes and combining the mixes to form a substantially continuous distribution that may exhibit and/or may be generally modeled by equation (2).

Any of the above-described mixtures of the diamond particles may be subjected to an HPHT process in the presence of a sintering aid that promotes intergrowth of the diamond particles, such as a solvent catalyst. For example, the solvent catalyst may comprise a metal-solvent catalyst, such as cobalt, iron, nickel, or alloys thereof. The metal-solvent catalyst may be in the form of a metal-solvent catalyst foil or a green layer placed adjacent to the mixture, metal-solvent catalyst particles that are mixed with the diamond particles of the mixture prior to HPHT sintering, or combinations of the foregoing. In other embodiments, the catalyst may be a metal carbonate (e.g., $MgCO_3$, $LiCO_3$, $NaCO_3$, $SrCO_3$, $CaCO_3$, or mixtures thereof) in the form of metal-carbonate particles dispersed through the diamond particles. Other catalysts include sulfates, phosphates, or other phosphorus-based catalysts.

In order to efficiently sinter the mixture, the mixture may be placed in a pressure transmitting medium, such as a refractory metal can, graphite structure, pyrophyllite and/or other pressure transmitting structure, or another suitable container or supporting element. The pressure transmitting medium, including the mixture, is subjected to an HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 80 kilobar) for a time sufficient to sinter and form the PCD material.

The PCD material so-formed exhibits a plurality of bonded diamond grains (i.e., diamond crystals) that form a network of bonded diamond grains. The bonded diamond grains define a plurality of interstitial regions between adjacent diamond grains in which catalyst is disposed, such as a metal-solvent catalyst, or a metal oxide (e.g., MgO) formed from a metal-carbonate catalyst. The plurality of bonded diamond grains may exhibit a diamond grain size distribution that is substantially similar to the diamond particle size distribution of the mixture subjected to the HPHT process (e.g., the diamond particle size distribution 100, 200, or 300) or may be different depending upon certain processing conditions, such as sintering pressure or other HPHT condition. That is, the HPHT processes may cause some of the relatively fine diamond particles of the mixture to dissolve in the solvent catalyst and re-deposit onto relatively large existing diamond particles of the mixture. Further, the high compressive stresses from the HPHT process may cause some of the diamond particles to fracture, plastically deform, or both.

In some embodiments, the diamond grain size distribution may generally exhibit a size distribution having an average diamond grain size (e.g., average diamond grain diameter), a standard deviation, a skewness, and a kurtosis with respective values that are the same or close to the respective values of the average particle size, standard deviation, skewness, and kurtosis of the diamond particle size distribution of the mixture 100 subjected to HPHT sintering. Additionally, in some embodiments, upon HPHT sintering the mixture 100, the diamond gain size distribution may also be characterized, at least in part, by the parameter θ. However, in the PCD material so-formed, x represents the average grain size of the diamond grain size distribution and σ represents the standard deviation of the diamond grain size distribution.

Further, when the PCD material is formed by HPHT sintering a mixture of diamond particles having a diamond particle size distribution that may be characterized by and/or generally modeled by equation (2), in some embodiments, the diamond grain size distribution in the PCD material so-formed may also may be characterized by and/or generally modeled by equation (2). However, in the PCD material so-formed, $D_L$ represents the largest-sized diamond grain and $D_S$ represents the smallest-sized diamond grain.

Because of the high-packing density of the diamond particles of the mixture, the interstitial regions of the PCD material occupied by the solvent catalyst may exhibit an average cross-sectional dimension (e.g., a diameter) of about 10 angstroms to about 1 μm and, more particularly, about 10 nm to less than about 1 μm. The PCD material so-formed may exhibit a density of at least about 80 percent theoretical density and, in some embodiments, the density may be at least about 90 percent of theoretical density.

Despite the presence of the solvent catalyst (e.g., a metal-solvent catalyst) in the PCD material, the PCD material may exhibit a thermal stability that is close to, substantially the same as, or greater than a partially leached PCD material having a different diamond grain size distribution and in which the metal-solvent catalyst (e.g., cobalt) is leached therefrom to a depth of about 60 μm to about 70 μm.

Figure 4:
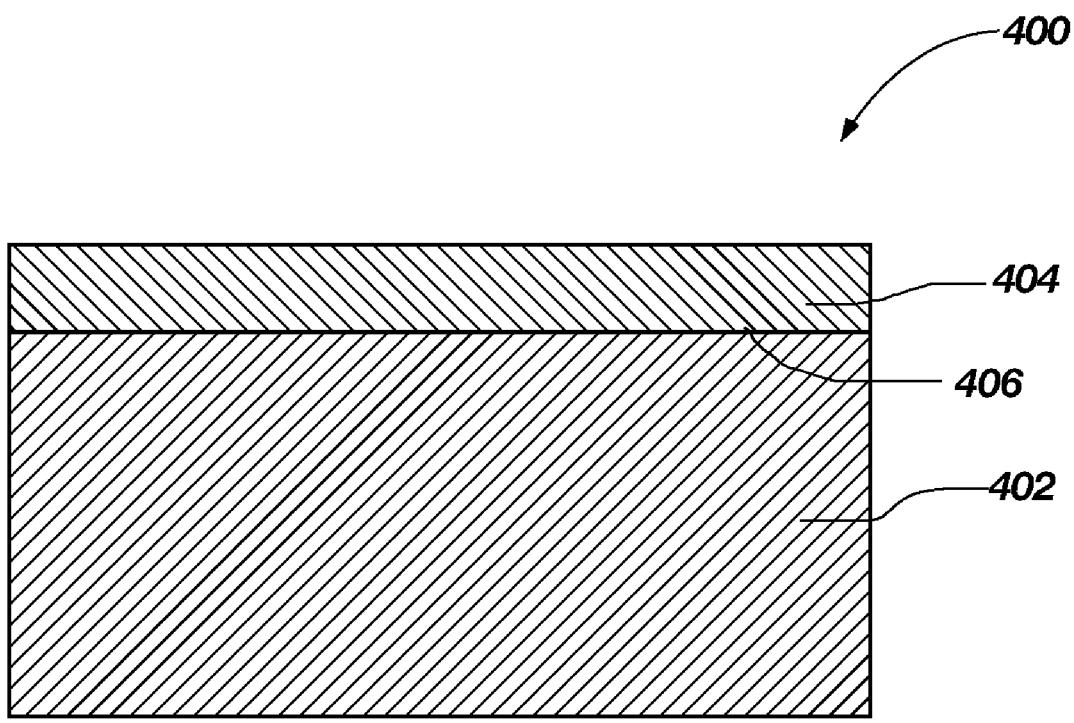
FIG. 4 is a cross-sectional view of a PDC including a PCD table that comprises a PCD material formed from any of the disclosed PCD materials according to an embodiment.

Referring to FIG. 4, the PCD material may form a PCD table of a PDC for cutting applications, bearing applications, and many other applications. FIG. 4 is a cross-sectional view of a PDC 400 according to an embodiment. The PDC 400 includes a substrate 402 bonded to a PCD table 404 that comprises any of the embodiments of the PCD materials described herein. The substrate 402 may be generally cylindrical or another selected configuration, without limitation. Although FIG. 4 shows the interfacial surface 406 as being substantially planar, the interfacial surface 406 may exhibit a selected non-planar topography, without limitation. The substrate 402 may include a metal-solvent catalyst, such as cobalt in cobalt-cemented tungsten carbide or another suitable material. Other materials that may be used for the substrate 402 include, without limitation, cemented carbides including titanium carbide, niobium carbide, tantalum carbide, vanadium carbide, and combinations of any of the preceding carbides cemented with cobalt, iron, nickel, or alloys thereof.

Figure 5:
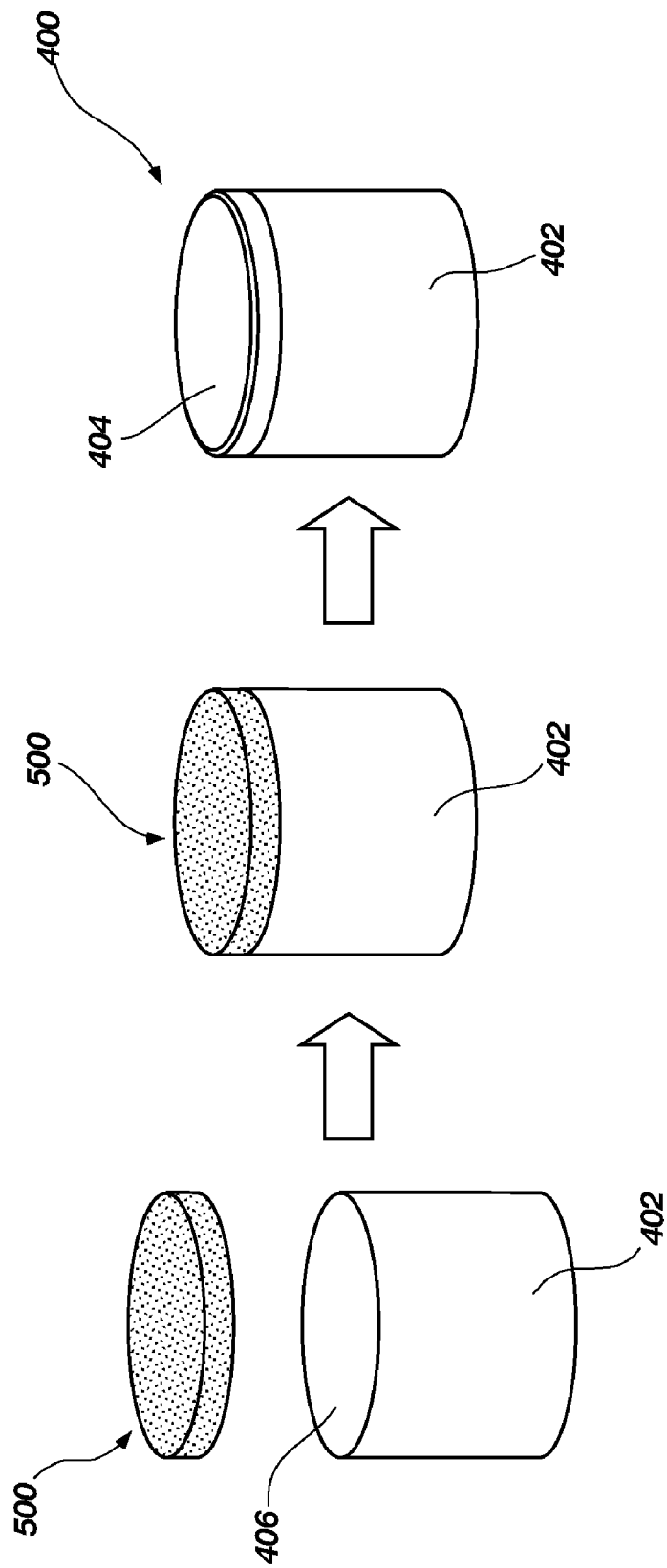
FIG. 5 is a schematic illustration of a method for fabricating the PDC shown in FIG. 4 according to an embodiment.

FIG. 5 is a schematic illustration of a method for fabricating the PDC 400 according to an embodiment. Referring to FIG. 5, a mixture 500, having a plurality of diamond particles having a broad diamond particle size distribution according to any of the above-described embodiments, is positioned adjacent to the interfacial surface 406 of the substrate 402. As previously discussed, the substrate 402 may include a metal-solvent catalyst. The mixture 500 and the substrate 402 may be subjected to an HPHT sintering process using conditions previously described with respect to the methods described herein for forming a PCD material. The PDC 400 so-formed includes a PCD table 404 that comprises the PCD material of the embodiments described herein bonded to the interfacial surface 406 of the substrate 402. If the substrate 402 includes a metal-solvent catalyst (e.g., cobalt in a cobalt-cemented tungsten carbide substrate), the metal-solvent catalyst may liquefy and infiltrate the mixture 500 to promote intergrowth between adjacent diamond particles of the mixture 500 and formation of the PCD material.

In other embodiments, the PCD table 404 may be separately formed using an HPHT sintering process and, subsequently, bonded to the interfacial surface 406 of the substrate 402 by brazing, using a separate HPHT bonding process, or any other suitable joining technique, without limitation. In yet another embodiment, the substrate may be formed by depositing a binderless carbide (e.g., tungsten carbide) via chemical vapor deposition onto the separately formed PCD table.

Figure 6:
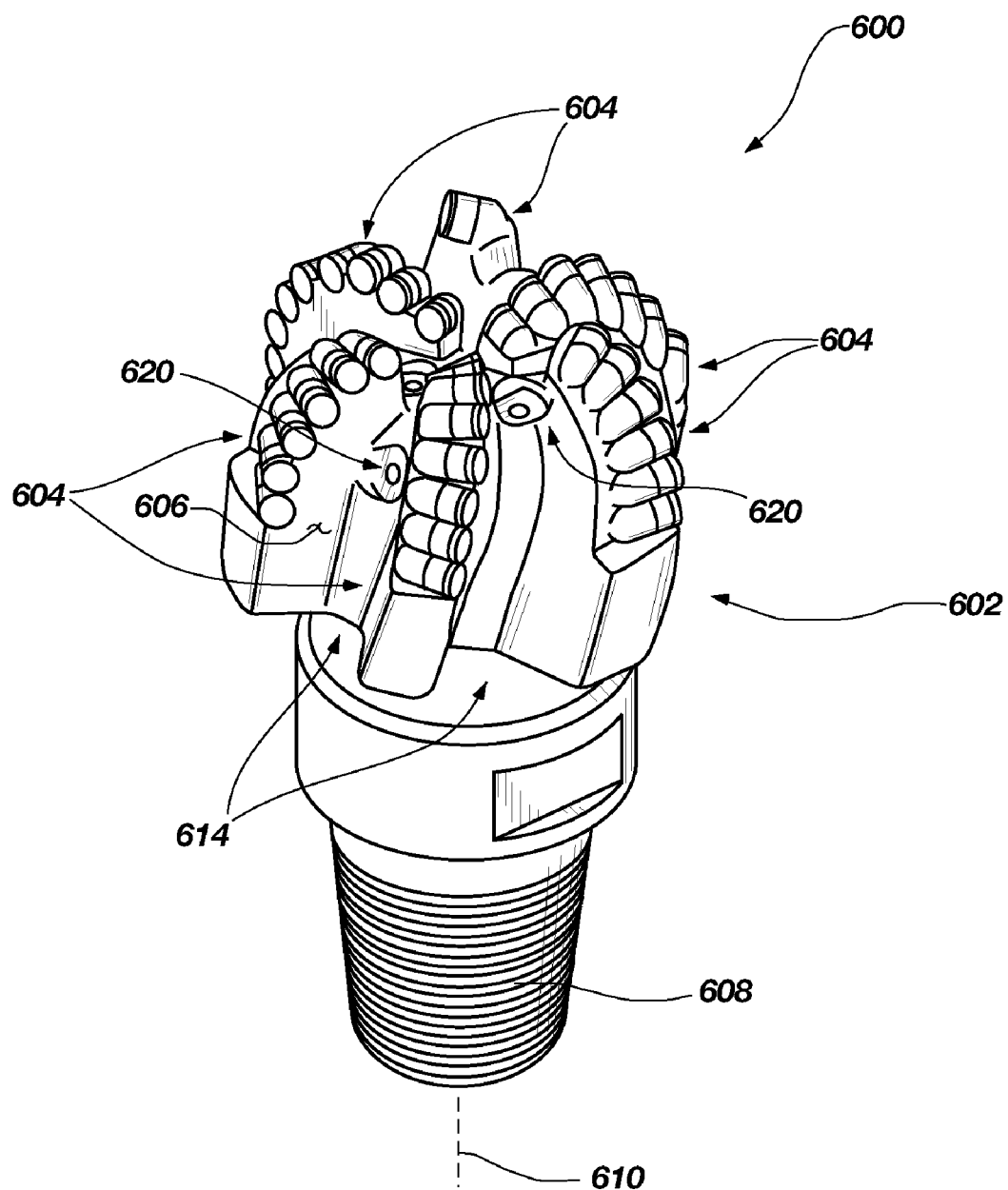
FIG. 6 is an isometric view of a rotary drill bit according to an embodiment that may employ one or more of the disclosed PDC embodiments.
Figure 7:
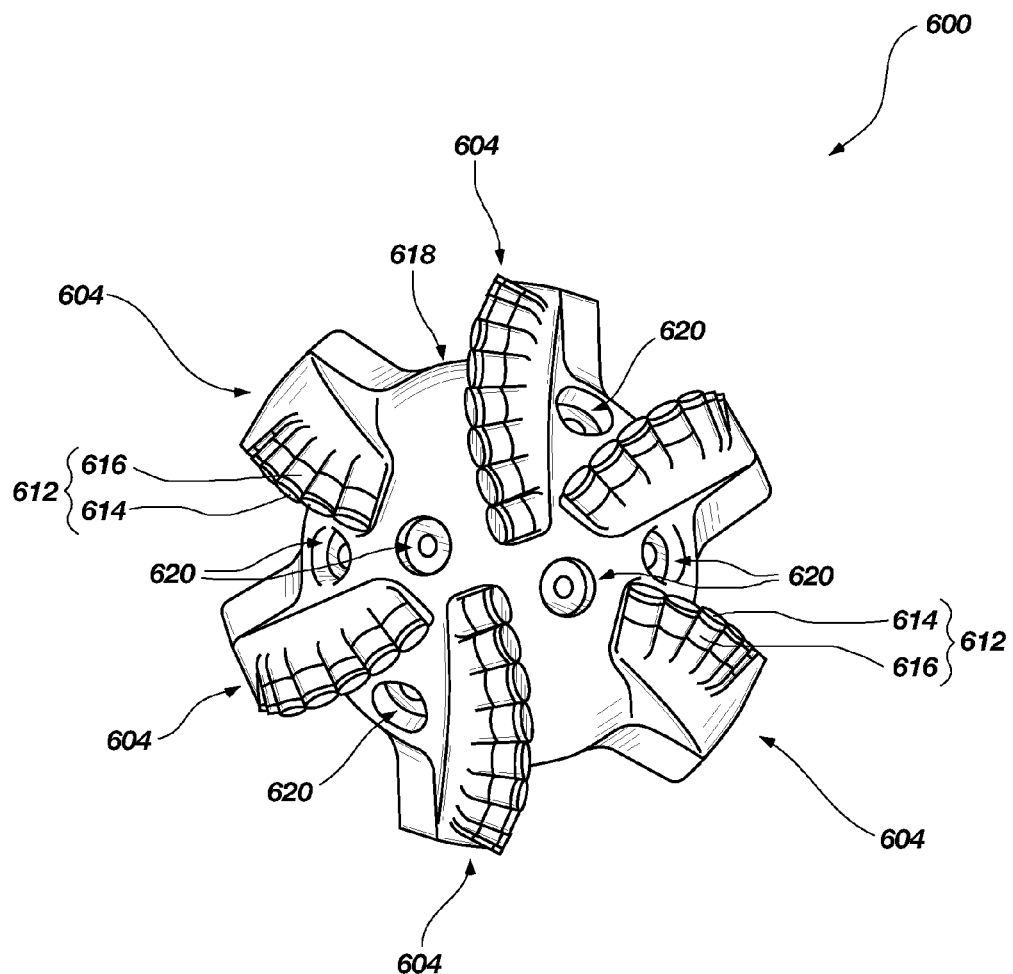
FIG. 7 is a top elevation view of the rotary drill bit shown in FIG. 6.

FIG. 6 is an isometric view and FIG. 7 is a top elevation view of a rotary drill bit 600 according to an embodiment. The rotary drill bit 600 includes at least one PDC configured according to any of the previously described PDC embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure configured for drilling into a subterranean formation by rotation about a longitudinal axis 610 and application of weight-on-bit. At least one PDC cutting element, configured according to any of the previously described PDC embodiments (e.g., the PDC 400 shown in FIG. 4), may be affixed to rotary drill bit 600 by, for example, brazing, mechanical affixing, or another suitable technique. With reference to FIG. 7, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in an embodiment, a number of the PDCs 612 may be conventional in construction. Also, circumferentially adjacent blades 604 define so-called junk slots 618 therebetween, as known in the art. Additionally, the rotary drill bit 600 includes a plurality of nozzle cavities 620 for communicating drilling fluid from the interior of the rotary drill bit 600 to the PDCs 612.

FIGS. 6 and 7 merely depict one embodiment of a rotary drill bit that employs at least one cutting element comprising a PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PDCs disclosed herein (e.g., the PDC 400 shown in FIG. 4) may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 8:
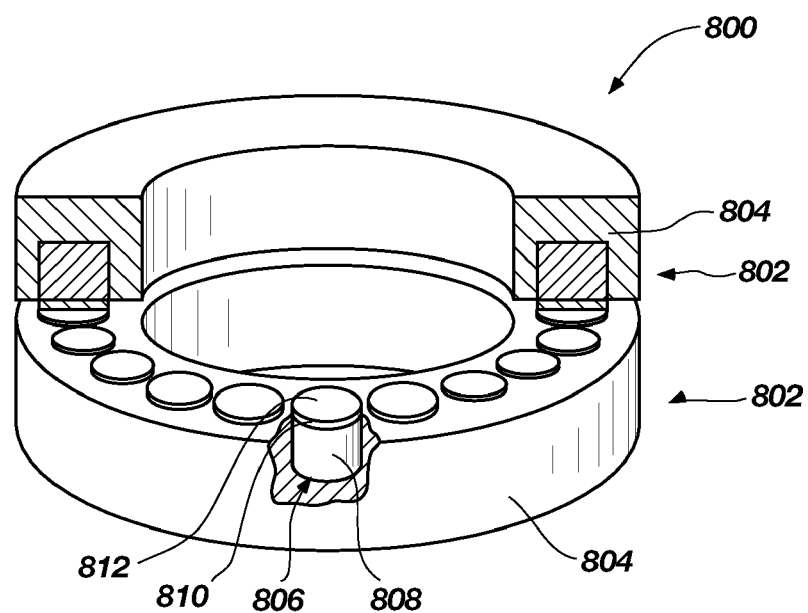
FIG. 8 is an isometric cut-away view of a thrust-bearing apparatus according to an embodiment, which may utilize any of the disclosed PDC embodiments as bearing elements.

FIG. 8 is an isometric cut-away view of a thrust-bearing apparatus 800 according to an embodiment, which may utilize any of the disclosed PDC embodiments as bearing elements. The thrust-bearing apparatus 800 includes respective thrust-bearing assemblies 802. Each thrust-bearing assembly 802 includes an annular support ring 804 that may be fabricated from a material, such as carbon steel, stainless steel, or another suitable material. Each support ring 804 includes a plurality of recesses (not labeled) that receives a corresponding bearing element 806. Each bearing element 806 may be mounted to a corresponding support ring 804 within a corresponding recess by brazing, press-fitting, using fasteners, or another suitable mounting technique. One or more, or all of bearing elements 806 may be configured according to any of the disclosed PDC embodiments. For example, each bearing element 806 may include a substrate 808 and a PCD table 810, with the PCD table 810 including a bearing surface 812.

In use, the bearing surfaces 812 of one of the thrust-bearing assemblies 802 bears against the opposing bearing surfaces 812 of the other one of the bearing assemblies 802. For example, one of the thrust-bearing assemblies 802 may be operably coupled to a shaft to rotate therewith and may be termed a "rotor." The other one of the thrust-bearing assemblies 802 may be held stationary and may be termed a "stator."

Figure 9:
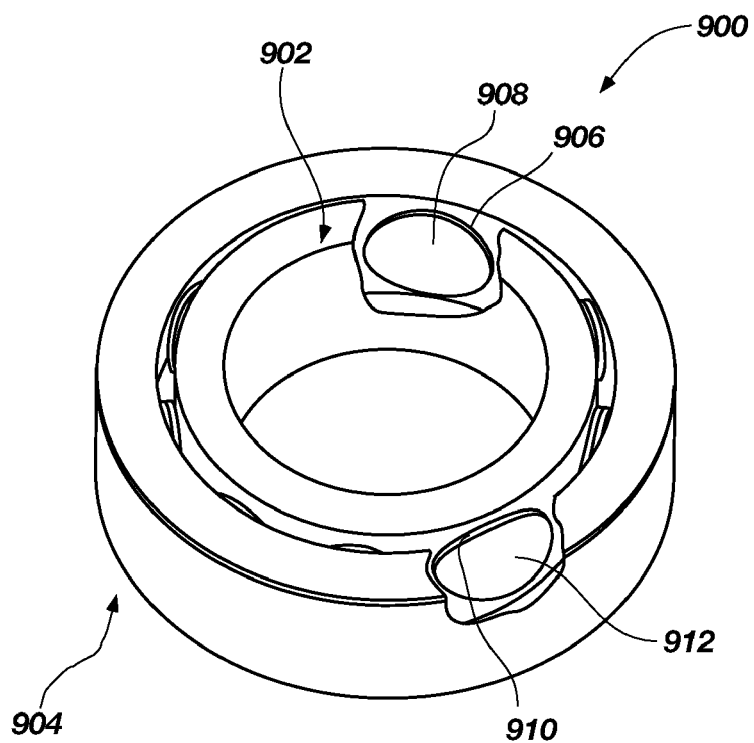
FIG. 9 is an isometric cut-away view of a radial bearing apparatus according to an embodiment, which may utilize any of the disclosed PDC embodiments as bearing elements.

FIG. 9 is an isometric cut-away view of a radial bearing apparatus 900 according to an embodiment, which may utilize any of the disclosed PDC embodiments as bearing elements. The radial bearing apparatus 900 includes an inner race 902 positioned generally within an outer race 904. The outer race 904 includes a plurality of bearing elements 906 affixed thereto that have respective bearing surfaces 908. The inner race 902 also includes a plurality of bearing elements 910 affixed thereto that have respective bearing surfaces 912. One or more, or all of the bearing elements 906 and 910 may be configured according to any of the PDC embodiments disclosed herein. The inner race 902 is positioned generally within the outer race 904, with the inner race 902 and outer race 904 configured so that the bearing surfaces 908 and 912 may at least partially contact one another and move relative to each other as the inner race 902 and outer race 904 rotate relative to each other during use.

Figure 10:
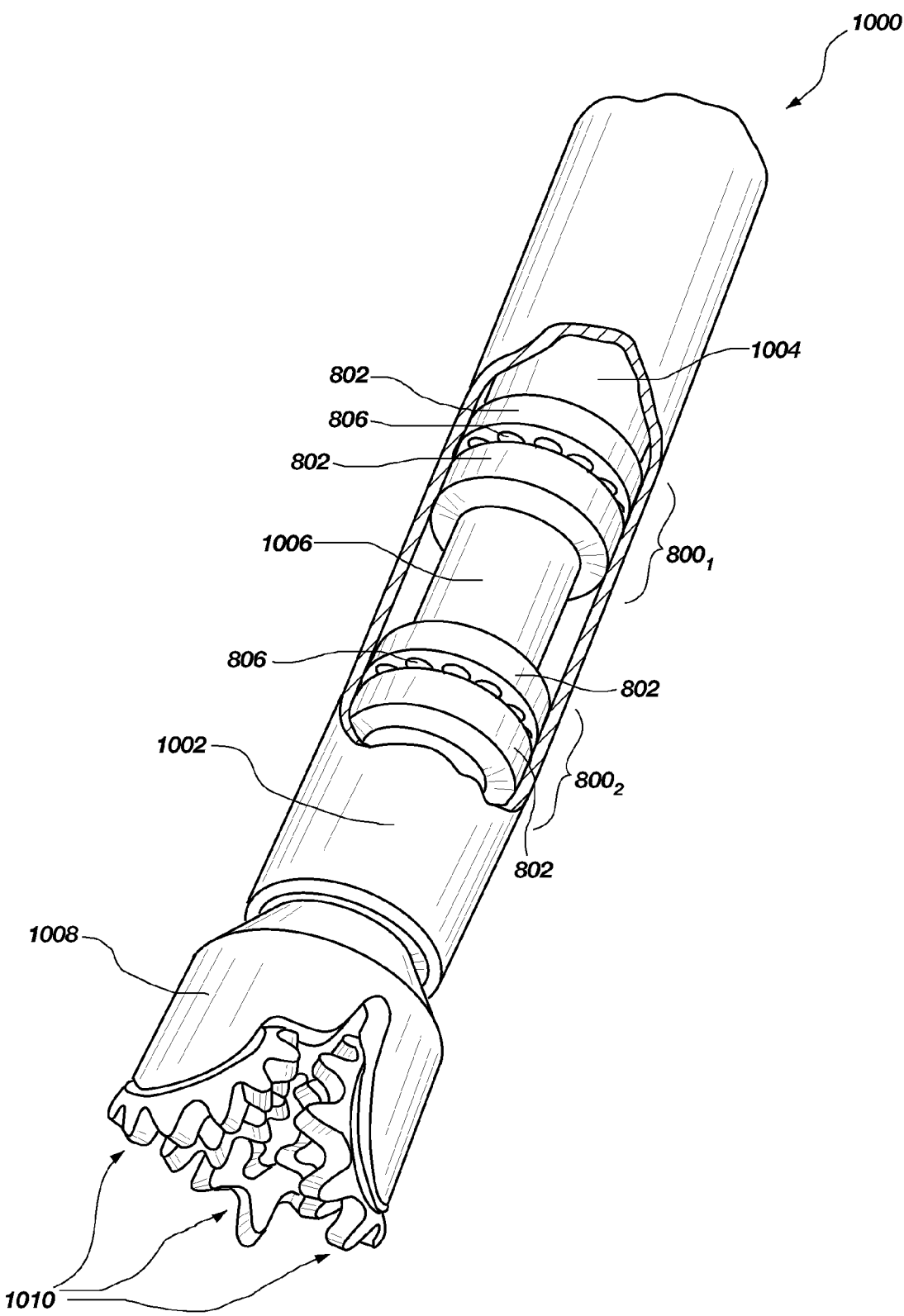
FIG. 10 is a schematic isometric cut-away view of a subterranean drilling system including at least one of the thrust-bearing apparatuses shown in FIG. 8 according to an embodiment.

Referring to FIG. 10, the thrust-bearing apparatus 800 and/or radial bearing apparatus 900 may be incorporated in a subterranean drilling system. FIG. 10 is a schematic isometric cut-away view of a subterranean drilling system 1000 that includes at least one thrust-bearing apparatus 800 shown in FIG. 8 according to an embodiment. The subterranean drilling system 1000 includes a housing 1002 enclosing a downhole drilling motor 1004 (i.e., a motor, turbine, or any other device capable of rotating an output shaft) that is operably connected to an output shaft 1006. A first thrust-bearing apparatus $800_1$ (FIG. 8) is operably coupled to the downhole drilling motor 1004. A second thrust-bearing apparatuses $800_2$ (FIG. 8) is operably coupled to the output shaft 1006. A rotary drill bit 1008 configured to engage a subterranean formation and drill a borehole is connected to the output shaft 1006. The rotary drill bit 1008 is shown as a roller cone bit including a plurality of roller cones 1010. However, other embodiments of the present invention may utilize different types of rotary drill bits, such as a so-called "fixed cutter" drill bit shown in FIGS. 6 and 7. As the borehole is drilled, pipe sections may be connected to the subterranean drilling system 1000 to form a drill string capable of progressively drilling the borehole to a greater depth within the earth.

One of the thrust-bearing assemblies 802 of the thrust-bearing apparatus $800_1$ is configured as a stator that does not rotate and the other one of the thrust-bearing assemblies 802 is configured as a rotor that is attached to the output shaft 1006 and rotates with the output shaft 1006. One of the thrust-bearing assemblies 802 of the thrust-bearing apparatus $800_2$ is configured as a stator that does not rotate and the other one of the thrust-bearing assemblies 802 is configured as a rotor that is attached to the output shaft 1006 and rotates with the output shaft 1006. The on-bottom thrust generated when the drill bit 1008 engages the bottom of the borehole may be carried, at least in part, by the first thrust-bearing apparatus $800_1$. Fluid flow through the power section of the downhole drilling motor 1004 may cause what is commonly referred to as "off-bottom thrust," which may be carried, at least in part, by the second thrust-bearing apparatus $800_2$.

In operation, drilling fluid may be circulated through the downhole drilling motor 1004 to generate torque and effect rotation of the output shaft 1006 and the rotary drill bit 1008 attached thereto so that a borehole may be drilled. A portion of the drilling fluid may also be used to lubricate opposing bearing surfaces of the bearing elements 806 of the thrust-bearing assemblies 802.

Figure 11:
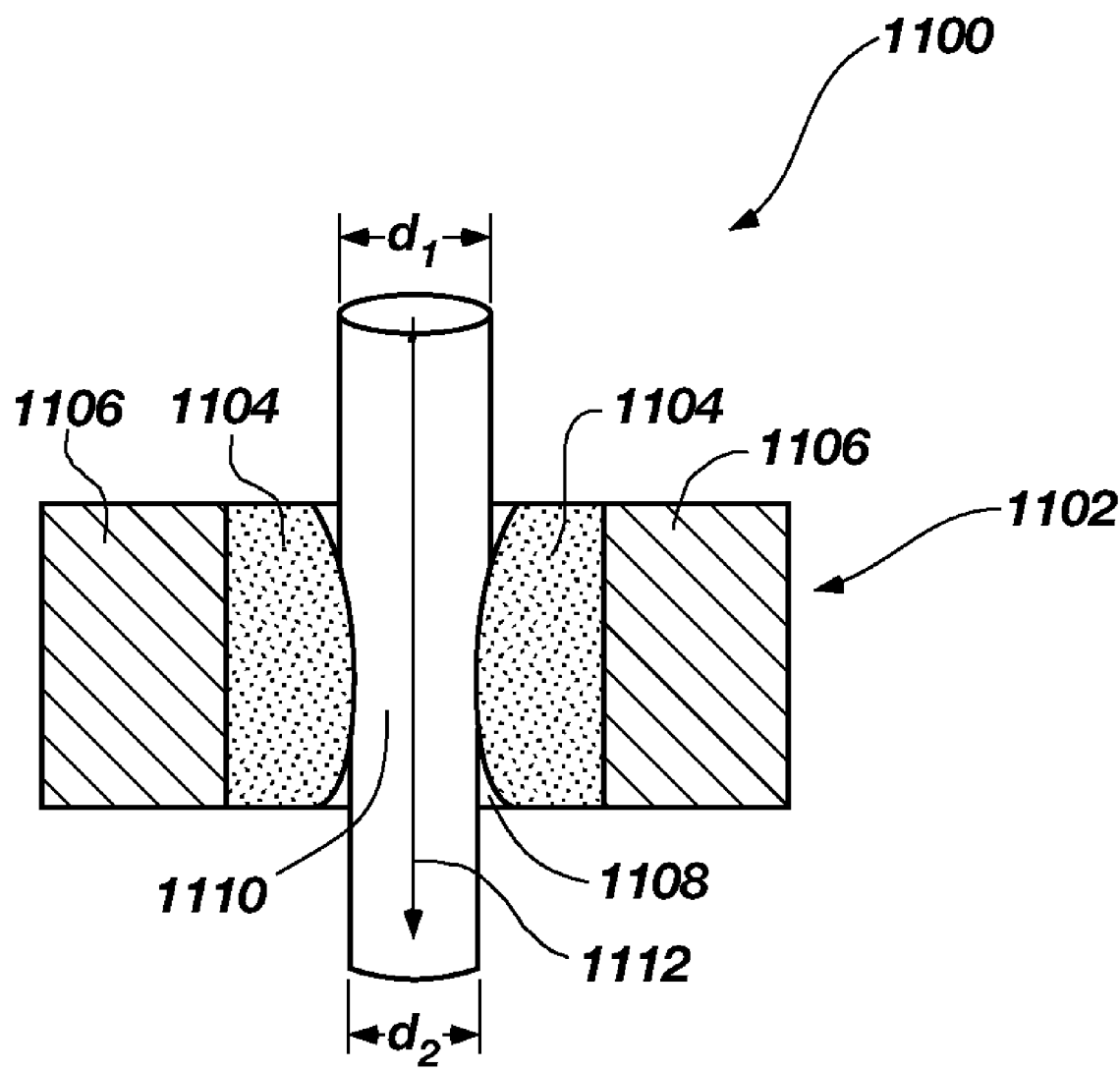
FIG. 11 is a side cross-sectional view of a wire-drawing die according to an embodiment that employs a PDC fabricated in accordance with the teachings described herein.

FIG. 11 is a side cross-sectional view of a wire-drawing die 1100 according to one embodiment that employs a PDC 1102 fabricated in accordance with the teachings described herein. The PDC 1102 includes an inner, annular PCD region 1104 comprising any of the PCD tables described herein that is bonded to an outer cylindrical substrate 1106 that may be made from the same materials as the substrate 402 shown in FIG. 4. The PCD region 1104 also includes a die cavity 1108 formed therethrough configured for receiving and shaping a wire being drawn. The wire-drawing die 1100 may be encased in a housing (e.g., a stainless steel housing), which is not shown, to allow for easier handling.

In use, a wire 1110 of a diameter $d_1$ is drawn through die cavity 1108 along a wire drawing axis 1112 to reduce the diameter of the wire 1110 to a reduced diameter $d_2$.

The following working examples set forth various formulations for forming PDCs. The following working examples provide further detail in connection with the specific embodiments described above.

Comparative Example 1

Two conventional PDCs were formed from a mixture of diamond particles having an average grain size of about 18 μm. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a conventional PDC. The PCD table of the conventional PDC was acid-leached to a depth of about 93 μm. The thickness of the PCD table of the PDC was 0.08665 inch and a 0.01365 inch chamfer was machined in the PCD table.

Figure 12:
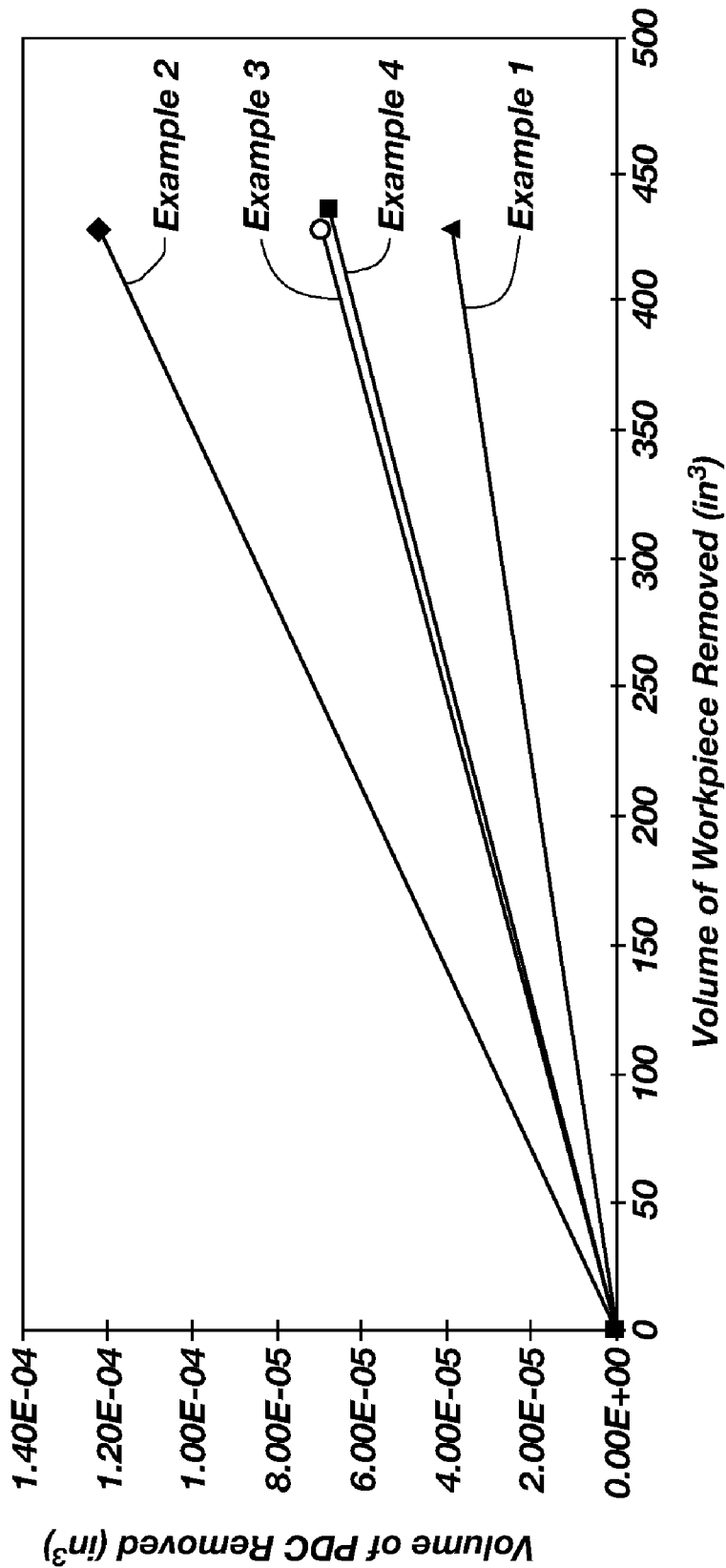
FIG. 12 is a graph illustrating performance characteristics as a function of workpiece volume cut for various conventional PDCs and PDCs fabricated according to working examples of the invention.

The thermal stability of one of the conventional PDCs so-formed was evaluated by measuring the distance cut in a Bane granite workpiece prior to failure, without using coolant, in a vertical turret lathe test. The distance cut is considered representative of the thermal stability of the PDC. The conventional PDC of comparative example 1 was able to cut a distance of about 1800 linear feet in the workpiece prior to failure. The wear resistance of one of the conventional PDCs was evaluated by measuring the volume of the PDC removed (i.e., the PCD table and substrate) versus volume of the workpiece removed in a vertical turret lathe test when the workpiece was cooled with coolant. The wear resistance results are shown in FIG. 12.

Comparative Example 2

Two conventional PDCs were formed from a mixture of diamond particles having an average grain size of about 18 μm as follows. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a conventional PDC. The thickness of the PCD table of the PDC was 0.0900 inch and a 0.01230 inch chamfer was machined in the PCD table. The PCD table was not leached.

The thermal stability of one of the conventional PDCs so-formed was evaluated by measuring the distance cut in the same Bane granite workpiece used in comparative example 1 prior to failure, without using coolant, in a vertical turret lathe test. The conventional PDC of comparative example 2 was able to cut a distance of about only 850 linear feet in the workpiece prior to failure. The wear resistance of one of the conventional PDCs was evaluated by measuring the volume of the PDC removed versus volume of the workpiece removed in a vertical turret lathe test when the workpiece was cooled with coolant. The wear resistance results are shown in FIG. 12.

Example 3

Two PDCs were formed from a mixture of diamond particles having a diamond particle distribution that can be generally modeled by equation (2) as follows. The mixture had a maximum diamond particle size $D_L$ of about 100 μm, a minimum diamond particle size $D_S$ of about 700 nm, and a distribution modulus n of about 0.37. A layer of the mixture was placed adjacent to a cobalt-cemented tungsten carbide substrate. The mixture and substrate were placed in a niobium can and subjected to HPHT conditions in an HPHT press at a temperature of about 1400° Celsius and a pressure of about 55 kilobar to form a conventional PDC. There was cobalt present in the PCD table because it was not leached. The thickness of the PCD table of the PDC was 0.091 inch and a 0.0124 inch chamfer was machined in the PCD table.

The thermal stability of one of the PDCs so-formed was evaluated by measuring the distance cut in the same Bane granite workpiece used in comparative example 1 prior to failure, without using coolant, in a vertical turret lathe test. The PDC of example 3 was able to cut a distance of about 1400 linear feet in the workpiece prior to failure. However, despite the presence of cobalt, the thermal stability of the PCD table of example 3 was still acceptable. Moreover, the thermal stability of the PCD table of example 3 was significantly improved compared to the thermal stability of the PCD table of comparative example 2.

The wear resistance of one of the PDCs was evaluated by measuring the volume of the PDC removed versus volume of the workpiece removed in a vertical turret lathe test when the workpiece was cooled with coolant, and the wear resistance results are shown in FIG. 12. The PCD table of example 3 exhibited a wear resistance that was less than that of comparative example 1, but significantly greater than that of comparative example 2. Therefore, the wear resistance of the PCD table of example 3 was still acceptable for subterranean drilling applications despite the presence of cobalt.

Example 4

Two PDCs were formed from a mixture of diamond particles having a broad diamond particle distribution. The mixture had an average diamond particle size of about 11.75 μm, a standard deviation of about 5.887 μm, a skewness of about 1.415 right skewed, and a kurtosis of about 1.902 Leptokurtic. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a PDC. There was cobalt present in the PCD table because it was not leached. The thickness of the PCD table of the PDC was 0.090 inch and a 0.0120 inch chamfer was machined in the PCD table.

The thermal stability of one of the PDCs so-formed was evaluated by measuring the distance cut in the same Bane granite workpiece used in comparative example 1 prior to failure without using coolant in a vertical turret lathe test. The PDC of example 4 was able to cut a distance of about 1000 linear feet in the workpiece prior to failure. The PCD table of example 4 was not as thermally stable as the leached PCD table of comparative example 1 and the PCD table of example 3. However, despite the presence of cobalt, the thermal stability of the PCD table of example 4 was greater than comparative example 2 and still acceptable for subterranean drilling applications.

The wear resistance of one of the PDCs so-formed was evaluated by measuring the volume of the PDC removed versus volume of the workpiece removed in a vertical turret lathe test when the workpiece was cooled with coolant, and the wear resistance results are shown in FIG. 12. The PCD table of example 4 exhibited a wear resistance that was less than that of comparative example 1, but significantly greater than that of comparative example 2. Therefore, the wear resistance of the PCD table of example 4 was still acceptable for subterranean drilling applications despite the presence of cobalt.

Comparative Example 5

Two conventional PDCs were formed that were similar to the PDC in comparative example 1. The PCD table of the conventional PDC was acid-leached to a depth of about 81 μm. The thickness of the PCD table of the PDC was 0.0856 inch and a 0.0129 inch chamfer was machined in the PCD table.

Figure 13:
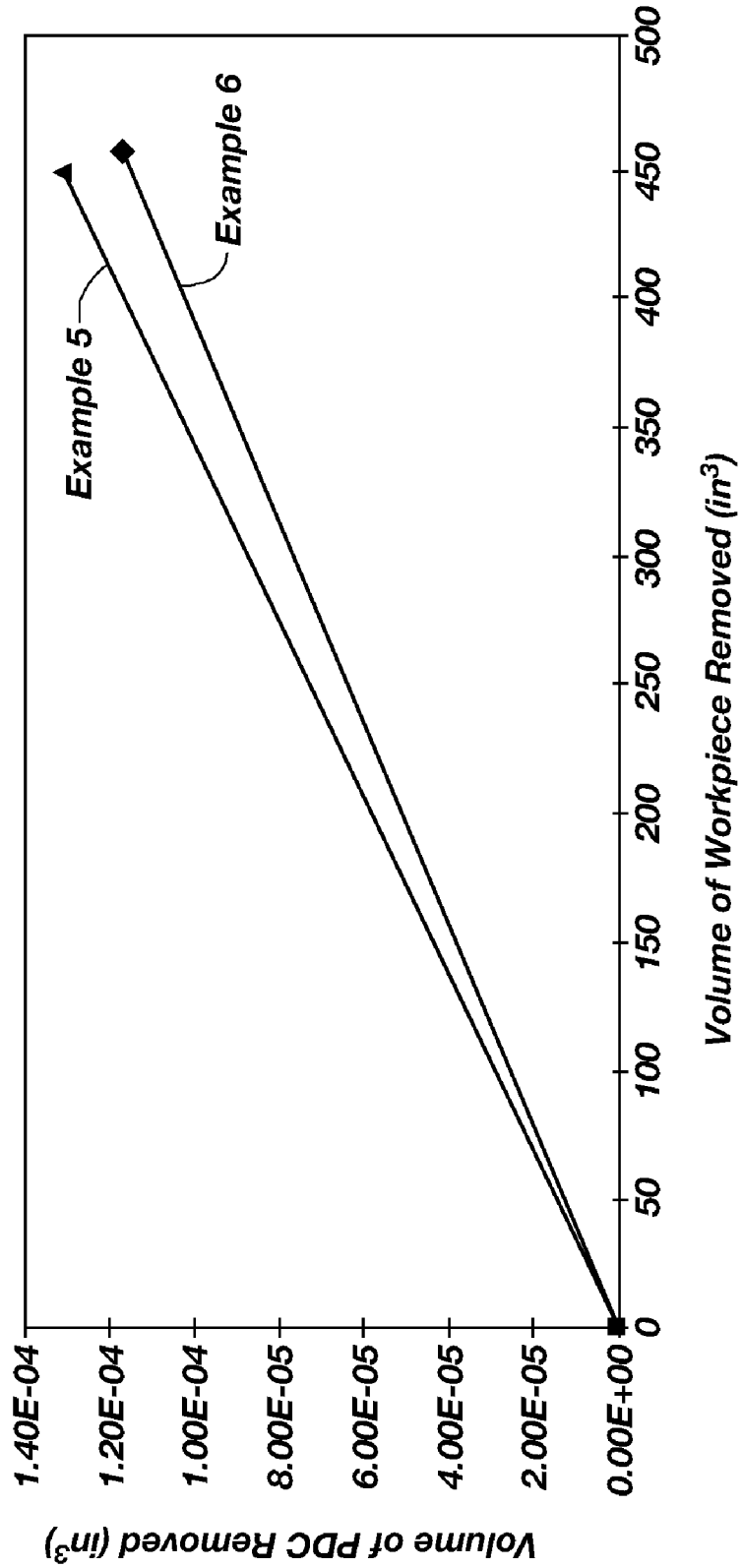
FIG. 13 is a graph illustrating performance characteristics as a function of workpiece volume cut for the PDC of comparative example 5 and the PDC fabricated according to working example 6 of the invention.

The thermal stability of one of the conventional PDCs so-formed was evaluated by measuring the distance cut in a Bane granite workpiece prior to failure without using coolant in a vertical turret lathe test. The conventional PDC of comparative example 5 was able to cut a distance of about 1800 linear feet in the workpiece prior to failure. The wear resistance of one of the conventional PDCs was evaluated by measuring the volume of the PDC removed (i.e., the PCD table and substrate) versus volume of the workpiece removed in a vertical turret lathe test when the workpiece was cooled with coolant. The wear resistance results are shown in FIG. 13.

Example 6

Two PDCs were formed from a mixture of diamond particles having a diamond particle distribution that can be generally modeled equation (2) as follows. The mixture had a maximum diamond particle size $D_L$ of about 60 μm, a minimum diamond particle size $D_S$ of about 375 nm, and a distribution modulus n of about 0.37. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a conventional PDC. There was cobalt present in the PCD table because it was not leached. The thickness of the PCD table of the PDC was 0.0933 inch and a 0.0109 inch chamfer was machined in the PCD table.

The thermal stability of one of the PDCs so-formed was evaluated by measuring the distance cut in the same Barre granite workpiece used in comparative example 5 prior to failure, without using coolant, in a vertical turret lathe test. The PDC of example 6 was able to cut a distance of about 1050 linear feet in the workpiece prior to failure. However, despite the presence of cobalt, the thermal stability of the PCD table of example 6 was acceptable for subterranean drilling application.

The wear resistance of one of the PDCs so-formed was evaluated by measuring the volume of the PDC removed versus volume of the workpiece removed in a vertical turret lathe test when the workpiece was cooled with coolant, and the wear resistance results are shown in FIG. 13. The PCD table of example 6 exhibited a wear resistance that was greater than that of comparative example 5 despite the presence of cobalt therein.

Comparative Example 7

A conventional PDC was fabricated that was similar to the PDC in comparative example 1. The conventional PDC was acid-leached to a depth of about 64 μm to remove substantially all of the cobalt from a region of the PCD table. The thickness of the PCD table of the PDC was 0.08830 inch and a 0.01230 inch chamfer was machined in the PCD table.

Figure 14:
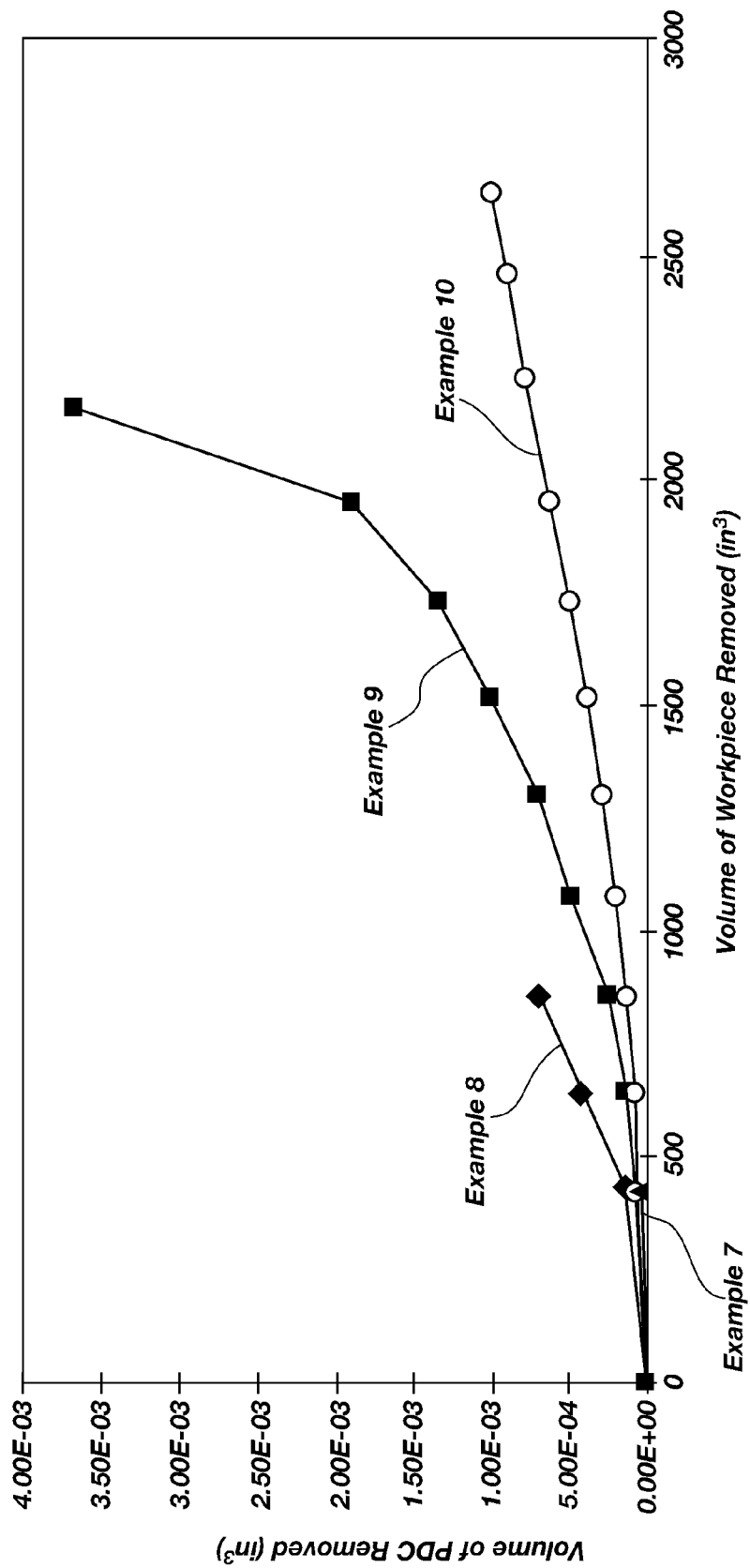
FIG. 14 is a graph illustrating performance characteristics as a function of workpiece volume cut for the PDC of comparative example 7 and the PDCs fabricated according to working examples 8-10 of the invention.

The thermal stability of the conventional PDC so-formed was evaluated by measuring the distance cut in a Barre granite workpiece prior to failure without using coolant in a vertical turret lathe test. The conventional PDC of comparative example 7 was able to cut a distance of about 2050 linear feet in the workpiece prior to failure. The wear resistance was evaluated by measuring the volume of the PDC removed (i.e., the PCD table and substrate) versus volume of the workpiece removed in a vertical turret lathe test when the workpiece was cooled with coolant. The wear resistance results are shown in FIG. 14.

Example 8

A PDC was formed from a mixture of diamond particles having a broad diamond particle distribution. The mixture had an average diamond particle size of about 25.13 μm, a standard deviation of about 10.78 μm, a skewness of about 0.044 right skewed, and a kurtosis of about −0.736 Platykurtic. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a PDC. There was cobalt present in the PCD table because it was not leached. The thickness of the PCD table of the PDC was 0.07950 inch and a 0.01210 inch chamfer was machined in the PCD table.

The thermal stability of the PDC so-formed was evaluated by measuring the distance cut in the same Barre granite workpiece used in comparative example 7 prior to failure without using coolant in a vertical turret lathe test. The PDC of example 8 was able to cut a distance of about 3025 linear feet in the workpiece prior to failure. Despite the presence of cobalt, the thermal stability of the PCD table of example 8 was significantly greater than that of comparative example 7.

The wear resistance was evaluated by measuring the volume of the PDC removed versus volume of the workpiece removed in a vertical turret lathe test when the workpiece was cooled with coolant, and the wear resistance results are shown in FIG. 14. The PCD table of example 8 exhibited a wear resistance that was less than that of comparative example 7, but still acceptable for subterranean drilling applications.

Example 9

A PDC was formed from a mixture of diamond particles having a broad diamond particle distribution. The mixture had an average diamond particle size of about 25.13 μm, a standard deviation of about 10.78 μm, a skewness of about 0.044 right skewed, and a kurtosis of about −0.736 Platykurtic. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a PDC. The PDC was acid-leached to a depth of about 65 μm to remove substantially all of the cobalt from a region of the PCD table. The thickness of the PCD table of the PDC was 0.08910 inch and a 0.01200 inch chamfer was machined in the PCD table.

The thermal stability of the PDC so-formed was evaluated by measuring the distance cut in the same Barre granite workpiece used in comparative example 7 without using coolant in a vertical turret lathe test. The PDC of example 9 was able to cut a distance of about 4000 linear feet in the workpiece prior to failure.

The wear resistance was evaluated by measuring the volume of the PDC removed versus volume of the workpiece removed in a vertical turret lathe test when the workpiece was cooled with coolant, and the wear resistance results are shown in FIG. 14. The PCD table of example 9 exhibited a wear resistance that appears to be less than that of comparative example 7, but greater than that of example 8.

Example 10

A PDC was formed from a mixture of diamond particles having a broad diamond particle distribution. The mixture had an average diamond particle size of about 25.13 μm, a standard deviation of about 10.78 μm, a skewness of about 0.044 right skewed, and a kurtosis of about −0.736 Platykurtic. A layer of the mixture was placed adjacent to a cobalt-cemented tungsten carbide substrate. The layer and substrate were placed in a niobium can and subjected to HPHT conditions in an HPHT press at a temperature of about 1400° Celsius and a pressure of about 55 kilobar to form a PDC. The PDC was acid-leached to a depth of about 200 μm to remove substantially all of the cobalt from a region of the PCD table. The thickness of the PCD table of the PDC was 0.08910 inch and a 0.01110 inch chamfer was machined in the PCD table.

The thermal stability of the PDC so-formed was evaluated by measuring the distance cut in the same Barre granite workpiece used in comparative example 7 prior to failure without using coolant in a vertical turret lathe test. The PDC of example 10 was able to cut a distance of about 9000 linear feet in the workpiece without failing.

The wear resistance was evaluated by measuring the volume of the PDC removed versus volume of the workpiece removed in a vertical turret lathe test when the workpiece was cooled with coolant, and the wear resistance results are shown in FIG. 14. The PCD table of example 10 exhibited a wear resistance that appears to be about the same as that of comparative example 7, but greater than that of examples 8 and 9.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises") and mean "including, but not limited to."

The invention claimed is:

1. A polycrystalline diamond material, comprising:
a plurality of bonded diamond grains, the plurality of bonded diamond grains exhibiting a substantially unimodal diamond grain size distribution characterized, at least in part, by a parameter θ that is about 0.25 to about 1.0; and
wherein:

$$\theta = \frac{x}{6 \cdot \sigma};$$

x is the average grain size of the substantially unimodal diamond grain size distribution, and is about 5 μm to about 30 μm; and σ is the standard deviation of the substantially unimodal diamond grain size distribution.

2. The polycrystalline diamond material of claim 1 wherein the parameter θ is about 0.3 to about 0.9.

3. The polycrystalline diamond material of claim 1 wherein the parameter θ is about 0.3 to about 0.7.

4. The polycrystalline diamond material of claim 1 wherein the parameter θ is about 0.5 to about 0.7.

5. The polycrystalline diamond material of claim 1 wherein the parameter θ is about 0.3 to about 0.4.

6. The polycrystalline diamond material of claim 1 wherein σ is about 2 μm to about 15 μm.

7. The polycrystalline diamond material of claim 1 wherein x is about 10 μm to about 20 μm, σ is about 4 μm to about 10 μm, and the parameter θ is about 0.3 to about 0.7.

8. The polycrystalline diamond material of claim 1 in which a thermal stability thereof is at least about as thermally stable as a partially leached polycrystalline diamond material having a leach depth of about 60 μm to about 70 μm and a different diamond grain size distribution.

9. A polycrystalline diamond compact, comprising a polycrystalline diamond table including the polycrystalline diamond material of claim 1; and
a substrate bonded to the polycrystalline diamond table.

10. The polycrystalline diamond compact of claim 9 wherein the substrate comprises a cemented-carbide material.

11. The polycrystalline diamond compact of claim 9, being configured as a cutting element.

12. The polycrystalline diamond compact of claim 9, being configured as a bearing element.

13. The polycrystalline diamond compact of claim 9, being configured as at least part of a wire drawing die.

14. A polycrystalline diamond material, comprising:
a plurality of bonded diamond grains, the plurality of bonded diamond grains exhibiting a substantially unimodal diamond grain size distribution characterized, at least in part, by a parameter θ that is about 0.3 to about 0.7; and
wherein:

$$\theta = \frac{x}{6 \cdot \sigma};$$

x is the average grain size of the substantially unimodal diamond grain size distribution and is about 10 μm to about 20 μm; and σ is the standard deviation of the substantially unimodal diamond grain size distribution.

15. The polycrystalline diamond material of claim 14 wherein the parameter θ is about 0.5 to about 0.7.

16. The polycrystalline diamond material of claim 14 wherein the parameter θ is about 0.3 to about 0.4.

17. The polycrystalline diamond material of claim 14 wherein x is about 12 μm to about 15 μm and σ is about 6 μm to about 8.5 μm.

18. The polycrystalline diamond material of claim 14 wherein σ is about 4 μm to about 10 μm.

19. A polycrystalline diamond material, comprising:
a plurality of bonded diamond grains defining a plurality of interstitial regions, the plurality of bonded diamond grains exhibiting a substantially unimodal diamond grain size distribution characterized, at least in part, by a parameter θ that is about 0.3 to about 0.9;

wherein:

$$\theta = \frac{x}{6 \cdot \sigma};$$

x is the average grain size of the substantially unimodal diamond grain size distribution and is about 10 μm to about 20 μm;

σ is the standard deviation of the substantially unimodal diamond grain size distribution; and a catalyst material is disposed in at least a portion of the plurality of interstitial regions.

* * * * *